United States Patent
Malik et al.

(10) Patent No.: US 7,873,367 B2
(45) Date of Patent: Jan. 18, 2011

(54) METHODS AND APPARATUS FOR LOCATIONING IN A WIRELESS NETWORK USING STATISTICAL WEIGHTING

(75) Inventors: Ajay Malik, Santa Clara, CA (US); Vinh-Phuong Le, Fremont, CA (US); Mahender Vangati, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 730 days.

(21) Appl. No.: 11/770,400

(22) Filed: Jun. 28, 2007

(65) Prior Publication Data

US 2009/0005064 A1 Jan. 1, 2009

(51) Int. Cl.
*H04W 24/00* (2009.01)
(52) U.S. Cl. ................... 455/456.1; 455/456.5
(58) Field of Classification Search ....... 455/456.1–457
See application file for complete search history.

(56) References Cited

U.S. PATENT DOCUMENTS

| | | | | |
|---|---|---|---|---|
| 6,414,635 | B1 * | 7/2002 | Stewart et al. | 342/457 |
| 2002/0168943 | A1 * | 11/2002 | Callaway et al. | 455/67.1 |
| 2003/0129992 | A1 * | 7/2003 | Koorapaty et al. | 455/456 |
| 2004/0203885 | A1 * | 10/2004 | Quaid | 455/456.1 |
| 2004/0203904 | A1 * | 10/2004 | Gwon et al. | 455/456.1 |
| 2008/0242310 | A1 * | 10/2008 | Vassilovski | 455/456.1 |

\* cited by examiner

*Primary Examiner*—Kent Chang
*Assistant Examiner*—Marcus Hammonds

(57) ABSTRACT

Methods and systems are provided for determining the location of a first wireless device (e.g., a mobile unit) within a wireless network comprising a plurality of second wireless devices (e.g., access points). The method includes identifying an overlap area corresponding to the intersection of RF ranges for the one or more second wireless devices then computing a set of signal strength values, each associated with a measure of RF signal strength (e.g., RSSI) received by the plurality of second wireless devices from the first wireless device. A decision metric is evaluated for a plurality of locations within the overlap area based on the set of signal strength values. The location of the first wireless device is determined by selecting, from the plurality of locations, a location having the optimum value of the decision metric within the overlap area. The decision metric may utilize a minimum mean square error (MMSE) calculation. A weighting function may be used to remove redundant or weak signal strength values. The systems and methods are applicable, for example, to networks operating in accordance with 802.11, RFID, WiMax, WAN, Bluetooth, Zigbee, UWB, and the like.

11 Claims, 3 Drawing Sheets

METHODS AND APPARATUS FOR LOCATIONING IN A WIRELESS NETWORK USING STATISTICAL WEIGHTING

TECHNICAL FIELD

The present invention relates to wireless local area networks (WLANs) and other networks incorporating RF elements and/or RF devices. More particularly, the present invention relates to methods for determining the physical location of wireless devices within a network.

BACKGROUND

There has been a dramatic increase in demand for mobile connectivity solutions utilizing various wireless components and WLANs. Such networks generally involve the use of wireless access points (APs) configured to communicate with mobile devices using one or more RF channels in accordance with various wireless standards and protocols.

It is often desirable to determine the physical location of a particular mobile device within a network. One way of accomplishing this task is to examine signal strength information related to the access points and/or the mobile units within the network environment, thus allowing the location to be inferred with an acceptable degree of accuracy.

In this regard, there are a number of known algorithms that use signal strength information (e.g., RSSI values) from a wireless device to help determine the location of another device. For example, in the 802.11 wireless environment, the signal strengths from the APs are typically used in combination with triangulation techniques to estimate the location of the MUs in the area. One popular method of triangulation, for example, looks for overlap areas between three nearby APs when those APs are associated with a particular mobile device being sought. From this information, standard triangulation techniques can be used to determine the location of the mobile device.

Such techniques are unsatisfactory in a number of respects. For example, depending upon antenna characteristics, the overlap area associated with the access points can be quite large in many circumstances, resulting in location results that are not very precise. On the other hand, if there are only two APs that "see" a particular mobile unit, this triangulation method can not be performed.

Accordingly, there is a need for improved methods and systems for better determining the location of wireless devices in a network.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
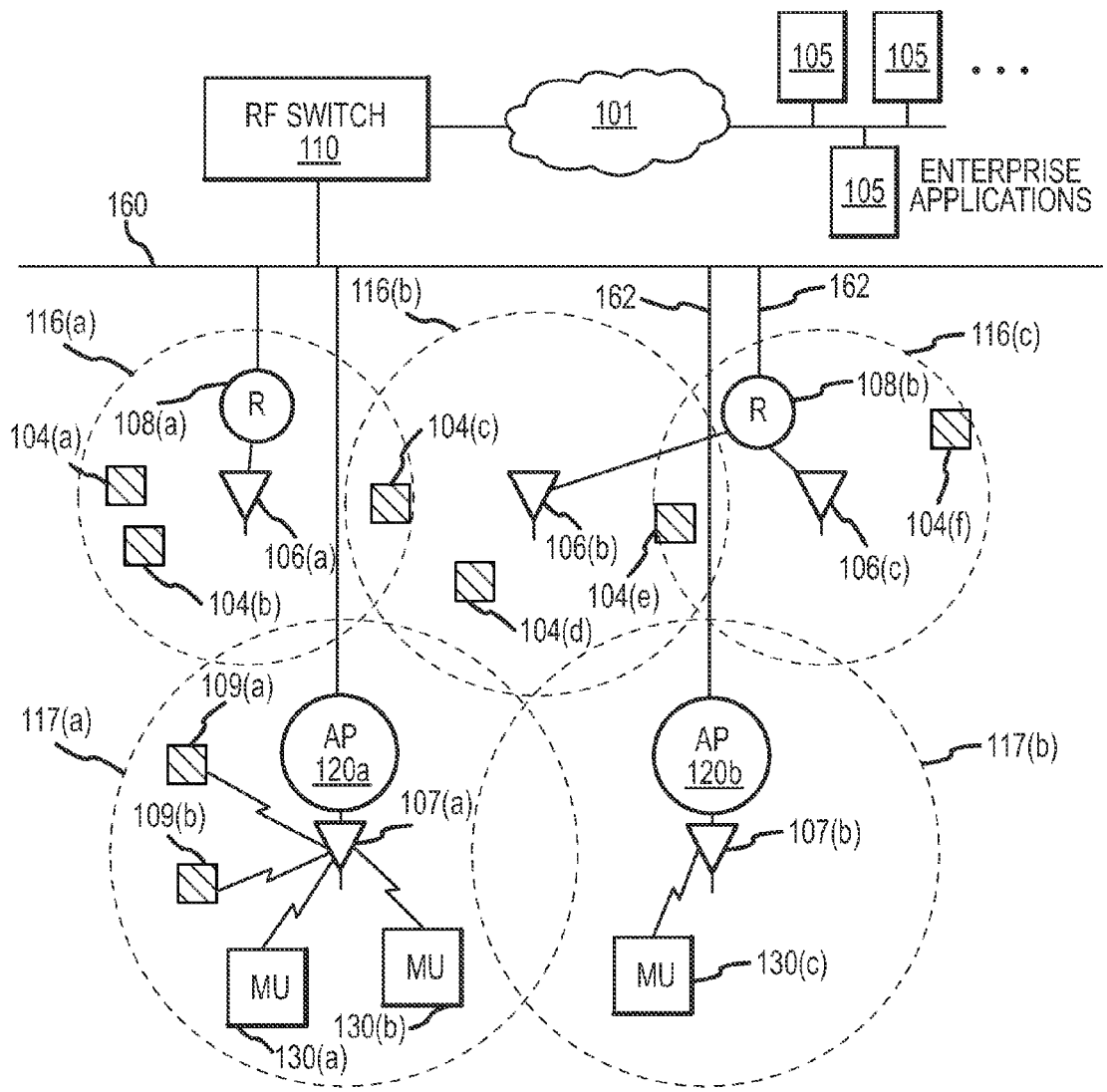
FIG. 1 is a conceptual overview of a wireless network useful in describing various embodiments.

The present invention relates to systems and methods for improved location determination within a wireless network using various statistical weighting techniques. Methods and systems are provided for determining the location of a first wireless device (e.g., a mobile unit) within a wireless network comprising a plurality of second wireless devices (e.g., access points). The method includes identifying an overlap area corresponding to the intersection of RF ranges for the one or more second wireless devices then computing a set of signal strength values, each associated with a measure of RF signal strength (e.g., RSSI) received by the plurality of second wireless devices from the first wireless device. A decision metric is evaluated for a plurality of locations within the overlap area based on the set of signal strength values. The location of the first wireless device is determined by selecting, from the plurality of locations, a location having the optimum value of the decision metric within the overlap area. The described techniques are reciprocal, in that mobile units may be used to determine the location of access points, or access points may be used to determine the location of mobile units.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission and data formatting protocols and that the system described herein is merely one example embodiment of the invention.

For the sake of brevity, conventional techniques related to signal processing, data transmission, signaling, network control, the 802.11 family of specifications, wireless networks, RFID systems and specifications, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figures may depict example arrangements of elements, additional intervening elements, devices, features, or components may be present in an embodiment of the invention.

Referring to FIG. 1, in an example system useful in describing the present invention, a switching device 110 (alternatively referred to as an "RF switch," "WS," or simply "switch") is coupled to a network 101 and 160 (e.g., an Ethernet network coupled to one or more other networks or devices) which communicates with one or more enterprise applications 105. One or more wireless access ports 120 (alternatively referred to as "access ports" or "APs") are configured to wirelessly connect to one or more mobile units 130 (or "MUs"). APs 120 suitably communicate with switch 110 via appropriate communication lines 162 (e.g., conventional Ethernet lines, or the like). Any number of additional and/or intervening switches, routers, servers and other network components may also be present in the system.

A number of RF tags ("RFID tags," or simply "tags") 104 may also be distributed throughout the environment. These tags, which may be of various types, are read by a number of RFID readers (or simply "readers") 108 having one or more associated antennas 106 provided within the environment. The term "RFID" is not meant to limit the invention to any particular type of tag. The term "tag" refers, in general, to any RF element that can be communicated with and has an ID (or "ID signal") that can be read by another component. Readers 108, each of which may be stationary or mobile, are suitably connective via wired or wireless data links to a RF switch 110.

A particular AP 120 may have a number of associated MUs 130. For example, in the illustrated topology, MUs 130(a) and 130(b) are associated with AP 120(a), while MU 130(c) is associated with AP 120(b). One or more APs 120 may be coupled to a single switch 110, as illustrated.

RF Switch 110 determines the destination of packets it receives over network 101 and routes those packets to the appropriate AP 120 if the destination is an MU 130 with which the AP is associated. Each WS 110 therefore maintains a routing list of MUs 130 and their associated APs 120. These lists are generated using a suitable packet handling process as is known in the art. Thus, each AP 120 acts primarily as a conduit, sending/receiving RF transmissions via MUs 130, and sending/receiving packets via a network protocol with WS 110.

RF switch 110 can support any number of tags that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

A particular RFID reader 108 may have multiple associated antennas 106. For example, as shown in FIG. 1, reader 108(a) is coupled to one antenna 106(a), and reader 108(b) is coupled to two antennas 106(b) and 106(c). Reader 108 may incorporate additional functionality, such as filtering, cyclic-redundancy checks (CRC), and tag writing, as is known in the art.

Each antenna 106, 107 has an associated RF range 116, 117 (or "signal strength contour") which depends upon, among other things, the strength of the respective antenna, and may be defined by a variety of shapes, depending upon the nature of the antenna (i.e., the RF range need not be circular or spherical as illustrated in FIG. 1). An antenna 107 coupled to an AP 120 may also communicate directly with RFID tags (such as tags 109(a) and 109(b), as illustrated). It is not uncommon for RF ranges to overlap in real-world applications (e.g., doorways, small rooms, etc.). Thus, as shown in FIG. 1, read point 116(a) overlaps with read point 116(b), which itself overlaps with read point 116(c), and range 117(a) overlaps with range 117(b).

As described in further detail below, switch 110 includes hardware, software, and/or firmware capable of carrying out the functions described herein. Thus, switch 110 may comprise one or more processors accompanied by storage units, displays, input/output devices, an operating system, database management software, networking software, and the like. Such systems are well known in the art, and need not be described in detail. Switch 110 may be configured as a general purpose computer, a network switch, or any other such network host. In a preferred embodiment, controller or switch 110 is modeled on a network switch architecture but includes RF network controller software (or "module") whose capabilities include, among other things, the ability to allow configure and monitor readers 108 and antennas 106.

RF switch 110 may include a cell controller (CC) and an RFID network controller (RNC) (not shown). The RNC includes hardware and software configured to handle RFID data communication and administration of the RFID network components, while the CC includes hardware and software configured to handle wireless data (e.g., in accordance with IEEE 802.11) from the mobile units and access ports within wireless cells. In one embodiment, RF switch 110 includes a single unit with an enclosure containing the various hardware and software components necessary to perform the various functions of the CC and RNC as well as suitable input/output hardware interfaces to networks 101 and 160.

Figure 2:
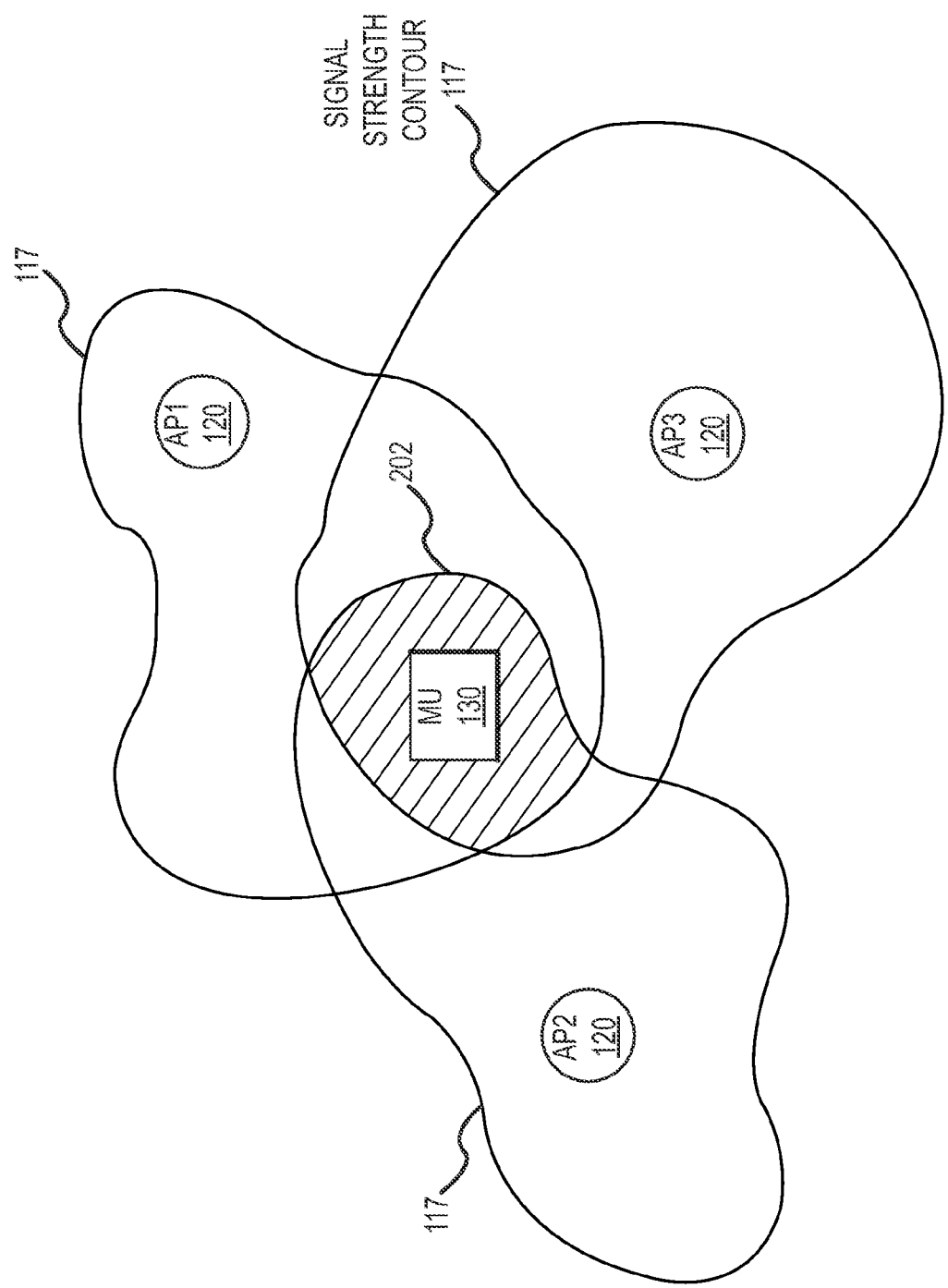
FIG. 2 is a conceptual diagram showing a mobile unit accompanied by three APs with overlapping RF contours.

Referring to the example conceptual plan view shown in FIG. 2, three access ports 120 (AP1, AP2, and AP3) or other RF devices are provided within an environment (which may be indoors and/or outdoors). It will be appreciated that a typical real-world environment may have many more such APs; three APs are depicted in this example solely for the purpose of clarity. The environment, which may correspond to a workplace, a retail store, a home, a warehouse, or any other such space, will typically include various physical features that affect the nature and/or strength of RF signals received and/or sent by the APs. Such feature include, for example, architectural structures such as doors, windows, partitions, walls, ceilings, floors, machinery, lighting fixtures, and the like. The present invention is not limited to two-dimensional layouts; it may be extended to three dimensional spaces as well.

Each AP 120 has an associated RF coverage area or signal strength contour 117, which corresponds to the effective range of its antenna or RF transmitter, as described in further detail below. These coverage areas may have any arbitrary shape or size, depending upon factors known in the art. For example, these coverage areas may be determined through a receiver signal strength indicator (RSSI) calculation, as is known in the art. APs 120 may comprise one or more processors accompanied by storage units, displays, input/output devices, an operating system, database management software, networking software, and the like. Such systems are well known in the art, and need not be described in detail here.

For wireless data transport, AP 120 may support one or more wireless data communication protocols—e.g., RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; GPRS; and proprietary wireless data communication protocols such as variants of Wireless USB.

Figure 3:
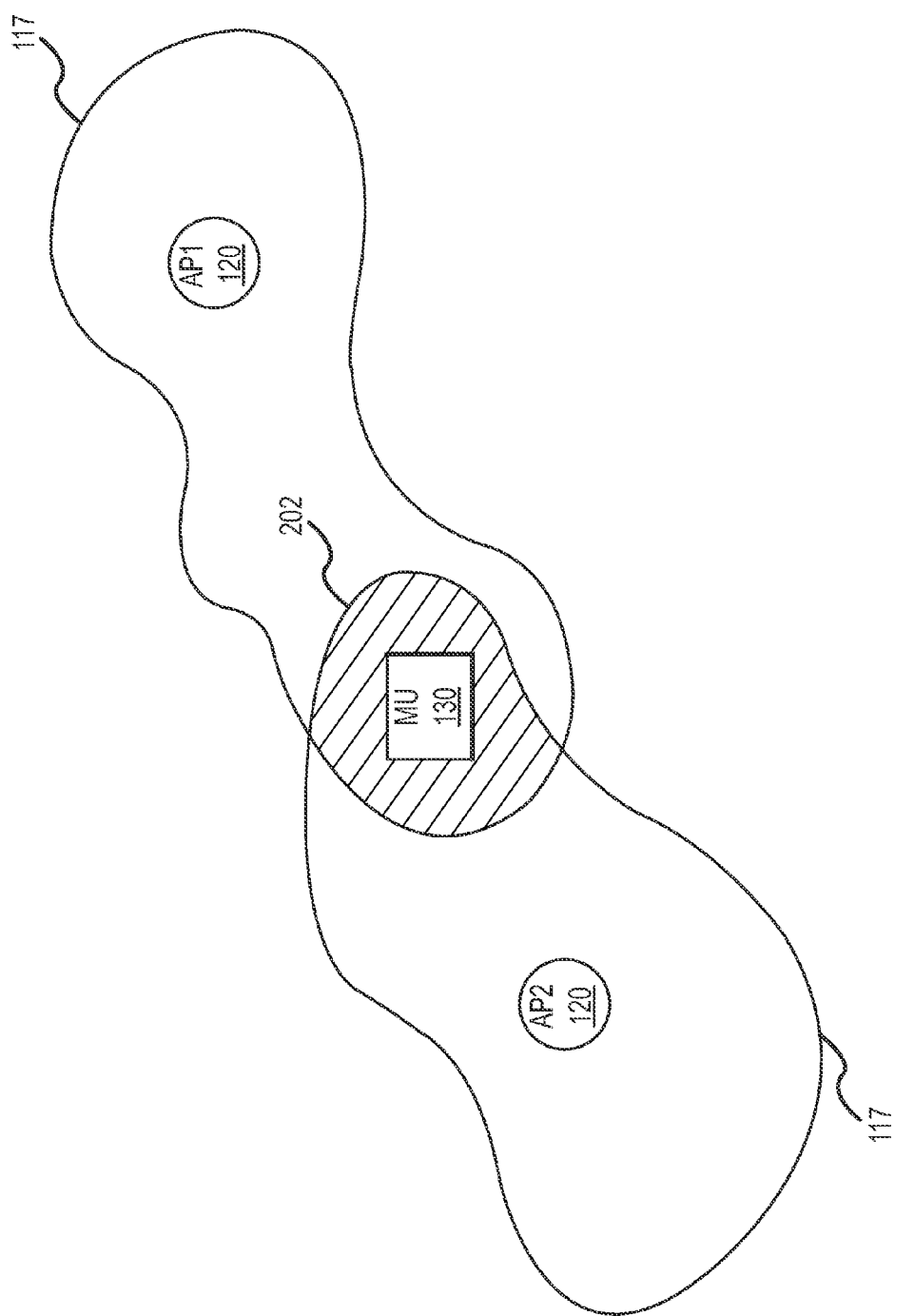
FIG. 3 is a conceptual diagram showing a mobile unit accompanied by two APs with overlapping RF contours.

A mobile unit (MU) 130 is also placed within the environment, wherein APs 120 are configured to wirelessly connect to MU 130. As shown, the three contours 117 may overlap to varying degrees. In the illustrated embodiment, for example, MU 130 falls within a region 202 where all three contours overlap. Stated another way, MU 130 is within the coverage range of all three APs. Thus, all three APs AP1, AP2, and AP3 are candidates for establishing a wireless connection with MU 130. Similarly FIG. 3 depicts an example environment wherein two APs (AP1 and AP2) having corresponding contours 117 overlap in a region 202, in which an MU 130 is located.

The methods described herein are reciprocal, in that the principle of operation applies for the MU with respect to the AP, as well as for the AP with respect to the MU. In the interest of conciseness, however, only the operation in one direction will be described below—i.e., locating an MU given information from the nearby APs.

In the triangulation method, the signal strength of MU 130 corresponding to each AP is known a priori as the result of a suitable reporting mechanism. A central software processing engine generates the contours 117 by either using a mathematical prediction model or actual site survey data. The MU signal strengths are typically organized into a tuple—e.g., y=(RSSI1, RSSI2, RSSI3, . . . , RSSIn), where RSSIn is the MU signal strength as seen by APn. A typical locationing algorithm synthesizes the AP coverage by drawing hypothetical areas as shown in FIGS. 2 and 3 with the hope that the overlap areas (202) indicates the location of MU 130. In another implementation, the site survey process produces a mapping of RSSI of the environment in a large table. The tuple y is then compared against either the database or the contours to find the general location of MU 130.

As mentioned previously, however, the overlap area 202 may be quite large—on the order of tens or hundreds of square feet. In the case where a look-up table is used, the variation due to multipath and environmental change will cause the live reading to be different from the RSSI stored table. Therefore the location result may be imprecise.

In accordance with the present invention, a decision metric is computed for every location (multiple discrete locations) within the overlap area 202. The location corresponding to the optimal metric value is deemed the most likely location at the end of the calculation. The metric may have a number of forms, depending upon the application. In one embodiment, a minimum mean square error (MMSE) metric is used, i.e.:

$$MMSE = \sqrt{\sum_{n=1}^{N} K_n (RSSI_{MU,n} - RSSI_{predicted\_AP,n})^2} \quad (1)$$

where N is the number of APs seen by the MU (N>1), $RSSI_{MU,n}$ is the live (or reported) RSSI of the MU to APn, $RSSI_{predicted\_AP,n}$ is the predicted RSSI for the MU from the perspective of APn, and K(n) is a weighting function.

The metric in equation 1 is evaluated at each grid location (e.g., a predefined regular rectangular grid) inside overlap area 202. The most likely location of the mobile device corresponds to the grid location indicated by the smallest value of MMSE. The weighting function is used in the case where many APs are seen by the MU, or duplicate RSSI values are found (i.e., RSSI values reported from the same AP). In such a case, the weighting function is introduced to pick out the best values. For example, if multiple RSSI values are reported from the same AP, more weight will be given to the stronger RSSI than the weaker ones. In another variation of the algorithm, if there are too many APs reported (e.g., a very large value of N), the system can set K to zero for the weak RSSI values, as these values are likely to contribute noise to the result.

While an MMSE equation is used for the exemplary decision metric described above, other statistical metric functions may be used—e.g., maximum log likelihood, least mean square, etc.

It will be appreciated that the method readily applies to locationing by RSSI mapping methods. Using the same MMSE criteria, decision metric equation (1) is calculated for every location in the map during site survey. The location with the smallest MMSE in the map is the most likely location of the MU. In the case of N=2 (shown in FIG. 3), triangulation methods will fail to converge; however, the algorithm described herein will still produce a best guess within reasonable limits.

In a variation of the statistical weight approach, the decision to discard and use the RSSI data can be based on time stamp of the data. That is, the RSSI values from each MU has an associated time stamp. The algorithm may select the most recent value to use in the locationing determination, rather than the older one.

While an 802.11-type environment is described above, the methods described apply to any locationing prediction that uses RSSI as a driving decision for computation, for example, RFID, WiMax, WAN, Bluetooth, Zigbee, UWB, and the like.

The methods described above may be performed in hardware, software, or a combination thereof. For example, in one embodiment one or more software modules are configured as a "locationing module" executed on a general purpose computer having a processor, memory, I/O, display, and the like. This computer module may be included with an AP 120, an MU 130, an enterprise application 105, or RF switch 110

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method in a locationing module of an Radio Frequency (RF) switch for locating a first wireless device having a first type within a wireless network comprising a plurality of second wireless devices having a second type, comprising the steps of:

identifying an overlap area corresponding to the intersection of RF ranges for the plurality second wireless devices;

computing a set of signal strength values, each associated with a measure of RF signal strength received by the plurality of second wireless devices from the first wireless device;

evaluating a decision metric for a plurality of locations within the overlap area based on the set of signal strength values, wherein the decision metric is a minimum mean square error (MMSE) defined by $$MMSE = \sqrt{\sum_{n=1}^{N} K_n(RSSI_{MU,n} - RSSI_{predicted\_AP,n})^2}$$

where N is the number of second wireless devices seen by the first wireless device, where N>1, $RSSI_{MU,n}$ is the live or reported receiver signal strength indicator (RSSI) of the first wireless device to the nth second wireless device, $RSSI_{predicted\_AP,n}$ is the predicted RSSI for the first wireless device from the perspective of the nth second wireless device, and K(n) is a weighting function used to remove duplicate RSSI values associated with the same second wireless device from the set of signal strength values; and determining the location of the first wireless device by selecting, from the plurality of locations, a location having the optimum value of the decision metric within the overlap area.

2. The method of claim 1, wherein the first type of wireless device is a mobile unit, and the second type of wireless device is an access port.

3. The method of claim 1, wherein the first type of wireless device is an access port, and the second type of wireless device is a mobile unit.

4. The method of claim 1, wherein the first and second types of wireless devices are configured to operate within a wireless environment selected from the group consisting of 802.11, Radio Frequency Identification (RFID), Worldwide Interoperability for Microwave Access (WiMax), Wide Area Network (WAN), Bluetooth, Zigbee, and Ultra-Wideband (UWB).

5. The method of claim 1, wherein the plurality of locations within the overlap area are defined in accordance with a regular grid.

6. The method of claim 1, wherein time stamp information associated with the plurality of signal strength values is used in conjunction with the decision metric to select the optimum value.

7. A wireless network system comprising:

a first wireless device having a first type;

a plurality of second wireless devices having a second type, wherein an overlap area exists for Radio Frequency (RF) ranges of the plurality of second wireless devices; and a locationing module in an RF switch configured to identify the overlap area, compute a set of signal strength values associated with a measure of RF signal strength received by the plurality of second wireless devices from the first wireless device, evaluate a decision metric for a plurality of locations within the overlap area based on the set of signal strength values, wherein the decision metric is a minimum mean square error (MMSE) defined by $$MMSE = \sqrt{\sum_{n=1}^{N} K_n(RSSI_{MU,n} - RSSI_{predicted\_AP,n})^2}$$

where N is the number of second wireless devices seen by the first wireless device, where N>1, $RSSI_{MU,n}$ is the live or reported receiver signal strength indicator (RSSI) of the first wireless device to the nth second wireless device, $RSSI_{predicted\_AP,n}$ is the predicted RSSI for the first wireless device from the perspective of the nth second wireless device, and K(n) is a weighting function used to remove duplicate RSSI values associated with the same second wireless device from the set of signal strength values; and determine the location of the first wireless device by selecting, from the plurality of locations, a location having the optimum value of the decision metric within the overlap area.

8. The system of claim 7, wherein the first type of wireless device is a mobile unit, and the second type of wireless device is an access port.

9. The system of claim 7, wherein the first type of wireless device is an access port, and the second type of wireless device is a mobile unit.

10. The system of claim 7, wherein the first and second types of wireless devices are configured to operate within a wireless environment selected from the group consisting of 802.11, Radio Frequency Identification (RFID), Worldwide Interoperability for Microwave Access (WiMax), Wide Area Network (WAN), Bluetooth, Zigbee, and Ultra-Wideband (UWB).

11. An apparatus comprising a processor and a locationing module configured to communicate with a first wireless device and a plurality of second wireless devices, the locationing module configured to:

identify an overlap area associated with the plurality of second wireless devices, compute a set of RSSI signal strength associated with the plurality of second wireless devices from the first wireless device, evaluate a decision metric for a plurality of locations within the overlap area based on the set of signal strength values, wherein the decision metric is minimum mean square error (MMSE) defined by $$MMSE = \sqrt{\sum_{n=1}^{N} K_n(RSSI_{MU,n} - RSSI_{predicted\_AP,n})^2}$$

where N is the number of second wireless devices seen by the first wireless device, where N>1, $RSSI_{MU,n}$ is the live or reported receiver signal strength indicator (RSSI) of the first wireless device to the nth second wireless device, $RSSI_{predicted\_AP,n}$ is the predicted RSSI for the first wireless device from the perspective of the nth second wireless device, and K(n) is a weighting function used to remove duplicate RSSI values associated with the same second wireless device from the set of signal strength values, and determine the location of the first wireless device by selecting, from the plurality of locations, a location having the optimum value of the decision metric within the overlap area.

* * * * *